United States Patent [19]

Halberschmidt et al.

[11] 3,960,627
[45] June 1, 1976

[54] MANUFACTURE OF GLAZING

[75] Inventors: Friedrich Halberschmidt; Helmut Paulus, both of Herzogenrath; Karl-Josef Feiten, Wuerselen, all of Germany

[73] Assignee: Saint-Gobain Industries, Neuilly-sur-Seine, France

[22] Filed: Sept. 30, 1974

[21] Appl. No.: 510,421

[30] Foreign Application Priority Data
France .............................. 73.36653

[52] U.S. Cl. ............................... 156/104; 156/106; 156/286; 156/289; 156/308; 156/323
[51] Int. Cl.² ................... B32B 17/00; B32B 31/00
[58] Field of Search ........... 156/104, 102, 323, 103, 156/105, 106, 99, 285, 286, 382, 289, 308, 309; 161/199, 190; 264/313, 316

[56] References Cited
UNITED STATES PATENTS

| | | | |
|---|---|---|---|
| 2,184,876 | 12/1939 | Sherts ................................ | 156/247 |
| 3,038,825 | 6/1962 | Little ................................. | 156/104 |
| 3,553,054 | 1/1971 | Maus ................................. | 156/286 |
| 3,723,220 | 3/1973 | Scher et al. ........................ | 156/289 |
| 3,806,387 | 4/1974 | Peetz et al. ........................ | 156/104 |
| 3,808,077 | 4/1974 | Rieser et al. ...................... | 156/104 |

FOREIGN PATENTS OR APPLICATIONS 1,035,360  7/1966  United Kingdom

Primary Examiner—William A. Powell
Assistant Examiner—Michael W. Ball
Attorney, Agent, or Firm—Pennie & Edmonds

[57] ABSTRACT

A glazing including a sheet of glass and a sheet of plastic adhesively fastened thereto is manufactured by assembling into a stack the sheet of glass, the sheet of plastic, a thin flexible protective sheet, and a thick cushion sheet. The stack is enclosed in a bag of rubber or similar flexible material which is evacuated to degas the stack.. The bag with the stack therein is then subjected to heat and pressure in an autoclave to bond together the glass and plastic sheets, whereafter the protective and cushion sheets can be readily separated from the remainder of the stack.

12 Claims, 3 Drawing Figures

MANUFACTURE OF GLAZING

The present invention pertains to the manufacture of laminated "safety" or shatterproof glazings, for example for use in the windshields of motor cars, which include a sheet of glass (or a sandwich of two sheets of glass with a plastic sheet between them) and, on the face of the glass sheet or of the glass-plastic-glass sandwich which is to be turned to the interior of the vehicle, a plastic sheet intended to protect the occupants, in case of accident, from contact with fragments of the glass sheet or sheets. Such glazings have been manufactured by assembling the laminations thereof into a stack, placing the stack in a bag of rubber or other flexible material, evacuating the bag to de-gas the stack and by subjecting the evacuated bag with the stack therein to heat and supra-atmospheric gas pressure in an autoclave.

Because these composite glazings must possess good optical properties, especially when used as windshields, it is customary in known methods for the manufacture thereof to include in the stack, on the side of the plastic sheet away from the glass sheet or glass-plastic-glass sandwich, a protective layer, itself of glass, which corresponds in shape and dimensions to the glazing being manufactured. This layer protects the plastic sheet of the glazing in process of manufacture from indentations which might otherwise be produced therein by irregularities in the inside surface of the bag as a result of the difference in pressure between the inside and outside of the bag. The protective layer is then removed after the various sheets of the glazing have been bonded together. Such a process is described in U.S. Pat. No. 3,806,387, which is assigned to the assignee hereof.

Safety glass is now usually manufactured in a curved shape, concave on the side turned toward the interior of the vehicle. It is therefore necessary for such rigid protective layers, hereinafter sometimes called laminating forms, themselves to possess on their convex surface a shape corresponding very closely to that which the exterior plastic sheet of the finished glazing is to possess. Otherwise, the pressure in the autoclave will not be applied uniformly over the surface of the glazing to bond the sheets thereof together. It has been found necessary in most cases to employ as a laminating form a glass sheet which was curved at the same time and on the same form as the glass sheet which is to constitute the glass element of the glazing. Thus even if the laminating form can be used repeatedly in the manufacture of glazings of a given shape and dimensions, at least one such laminating form must be provided for each of the different types of windshield or other glazing under manufacture. Another problem resides in the fact that after pressing, the laminating form may adhere undesirably to the plastic sheet of the glazing. Separation of the laminating form from the glazing requires care, and in spite of all reasonable precautions there occurs a certain amount of breakage of the glazings or of the laminating forms.

The invention provides a process for the manufacture of glazings of the type hereinabove described in which the rigid laminating form is replaced by a protective layer which is sufficiently flexible to accommodate to any of a wide variety of glazing shapes, transmitting uniformly over the area thereof the pressure exerted on the rubber bag during the bonding step, but which nevertheless protects the plastic sheet on the concave side of the glazing from the flexible bag. This protective layer comprises a thin sheet of elastic material having a smooth surface and a Shore hardness of at least 30, positioned against the plastic sheet of the glazing being manufactured, and a thick sheet of a readily deformable material which absorbs and cushions local departures of the bag from a smooth shape.

Preferably the thin elastic sheet has a thickness of from 1 mm. to 3 mm. whereas the thick sheet of readily deformable material has a thickness of from 5 mm. to 30 mm.

In the assembly which makes up the protective layer according to the invention each of the component elements has its own function. The elastic sheet is applied directly to the layer of plastic of the glazing, and in view of its elastic properties it can take on all of the shapes employed in present day windshield manufacture. Thus this elastic sheet can readily cover not only plane or cylindrically curved glazings but also those having a spherical or double curvature. Moreover this elastic sheet does not undergo local deformation except in a negligible degree in view of its hardness. Hence it provides a smooth fault-free counterform.

The thick sheet of readily deformable material which covers the elastic sheet has in contrast the function of absorbing at least in part local excessive pressures which may develop as a result of the formation of folds in the rubber bag due to the curvature of the laminated glass being manufactured. By reason of the thick deformable cushion sheet, these folds do not produce excessive local pressures on the elastic protective sheet and the effect of such folds can therefore not be transferred to the sheet of plastic material of the glazing being manufactured.

For the elastic sheet it is desirable to use in accordance with the invention a sheet of silicone rubber having a thickness of 2 mm. and a Shore hardness of about 40. For the easily deformable cushion sheet, there is employed in a preferred practice of the invention a layer of cellular material such as for example polystyrene, polyvinylchloride, polyethylene or polyurethane.

The thin protective sheet of elastic material and the thick cellular cushion sheet may be fastened together. It is alternatively possible to fasten the cushion sheet adhesively to the inner surface of the rubber bag. It is then sufficient to place the thin elastic sheet on top of the plastic sheet of the glazing being manufactured, and then to insert into the bag the stack comprising the sheets which make up the glazing and the elastic sheet, with the latter next to the cushion sheet which is fastened inside the bag.

According to another advantageous feature of the invention, the cushion sheet is made of a foamed material having closed cells or voids therein. During evacuation of the stack in the rubber bag the cushion sheet will then swell by reason of the relative excess pressure appearing in these closed cells. This distention also occurs parallel to the interface between the cushion sheet and the elastic sheet, and may amount to one or two percent or even more. This stretching is communicated to the elastic sheet of the protective layer, and in this way there is fostered a smooth and correct application of the plastic sheet to the glass of the glazing.

The process of the invention may further include fastening of the elastic sheet and cushion sheet together at their periphery or at a portion thereof, and also detachably fastening of the plastic sheet of the glazing to the elastic sheet of the protective layer at their periphery or at a portion thereof. These steps further foster stretching and smoothing of the plastic sheet of the glazing against the glass sheet thereof.

Although the process of the invention is as presently contemplated primarily employed in the lamination of a plastic sheet to a sheet of glass, it is possible to employ it for the assembly of plural sheets of plastic material together. It is in such case particularly advantageous to fasten together at their periphery the cushion sheet and the plastic sheets which are to be laminated together, whatever their number. It is in this way possible to produce plural-layer plastic laminates of perfect optical properties which can then be combined with a glass sheet or sheets or be otherwise employed.

BRIEF DESCRIPTION OF THE DRAWING

The invention will now be further described in terms of a number of presently preferred modes of practice thereof and exemplary embodiments of the product thereof, and with reference to the accompanying drawings in which.

DETAILED DESCRIPTION OF PREFERRED EMBODIMENTS

Figure 1:
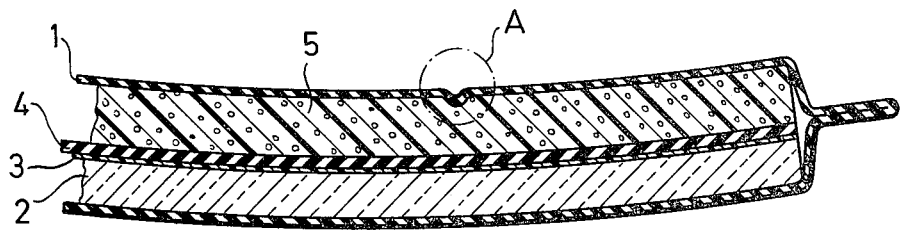
FIG. 1 is a fragmentary sectional view through a rubber bag containing the laminations of a glazing in process of manufacture in accordance with the invention and through the protective layer of the invention employed in that process.

In FIG. 1 reference character 1 identifies the rubber bag into which are placed for bonding the sheets of the glazing being manufactured and the composite protective layer. The glazing comprises a glass sheet 2 and a plastic sheet 3. The sheet of glass 2 has the shape of a curved windshield and may be a tempered glass sheet. This sheet is to be coated on its concave surface (which will be turned to the interior of the motor car) with a sheet 3 of plastic material. The sheet 3 may desirably possess the properties described in the copending application of Roger Orain et al., Ser. No. 369,087, filed June 11, 1973, and which is assigned to the assignee hereof for the correspondingly positioned sheet in the laminate of that copending application. In particular it may be made of a weakly reticulated aliphatic polyurethane. The sheet 3 may possess adhesive properties so that it will adhere to the glass sheet 2 under simple action of heat and pressure without supply of separate adhesive. Alternatively however the sheet 3 may be coated, before assembly to the glass 2, with a coating which is rendered adhesive in character by the application of heat and/or pressure.

On top of the plastic sheet 3 there is disposed a smooth elastic protective sheet 4 of silicone rubber having a thickness of 2 mm. and a Shore hardness of about 40. On top of the protective sheet 4 there is disposed a cushion 5 about 15 mm. in thickness and advantageously composed of expanded polystyrene. The layers 2, 3, 4 and 5, all of which advantageously have substantially the same shape and the same dimensions, are first simply laid on top of each other at ambient temperature to produce a four-layer stack, and the entire stack is then placed inside the rubber bag 1. The air within the bag is then evacuated. This serves to press tightly together the layers of the stack, and in particularly the layers 2 and 3 of the glazing.

In place of a rubber bag it is possible to use a bag made of an appropriate plastic material sealed at its edges. Evacuation of the stack may be carried out according to the method described in U.S. Pat. No. 3,769,133 which is assigned to the assignee hereof.

After the stack has been evacuated it is placed, in its rubber bag, in an autoclave where it is subjected to heat and pressure. The temperature inside the autoclave is raised until it reaches a level of the order of from 95° to 115°C. and where the pressure is of the order of three atmospheres. Under these conditions the adhesive layer if present is activated and the plastic sheet 3 is caused to adhere firmly and permanently to the sheet of glass 2.

One of the advantages of the process of the invention is schematically illustrated in FIG. 1. In that figure reference character A identifies a locality in which the wall of the rubber bag exhibits a crease or fold, appearing unavoidably as a result of the concave shape of the windshield being manufactured. The ridge formed at this fold is effectively absorbed in the cushion sheet 5 of readily deformable material. It produces a local surface identation in this cushion but this identation is not transmitted through the thickness of the cushion so that no deforming pressure appears at the thin elastic protective sheet 4. Thus the plastic layer 3 of the glazing is pressed against the glass sheet 2 with a perfectly uniform pressure over the entire surface thereof.

After treatment by heat and pressure inside the autoclave, which may take a time extending from a few minutes to one or two hours according to the nature of the glazing layers and/or of the adhesive employed, the rubber bag is left to cool with the laminate inside thereof. The laminate is then withdrawn from the bag, the cushion 5 is removed and lastly the silicone rubber sheet 4 is carefully separated from the exterior surface of the plastic layer 3. The separation of the rubber silicone sheet 4 from the laminated produce (comprising layers 2 and 3) is however much easier than would the separation of a protective form of glass from that product because adherence of the silicone rubber sheet 4 to the surface of the plastic layer 3 is much weaker than the adherence of glass to that plastic layer. Moreover the great flexibility of the sheet 4 of silicone rubber facilitates its removal.

Figure 2:
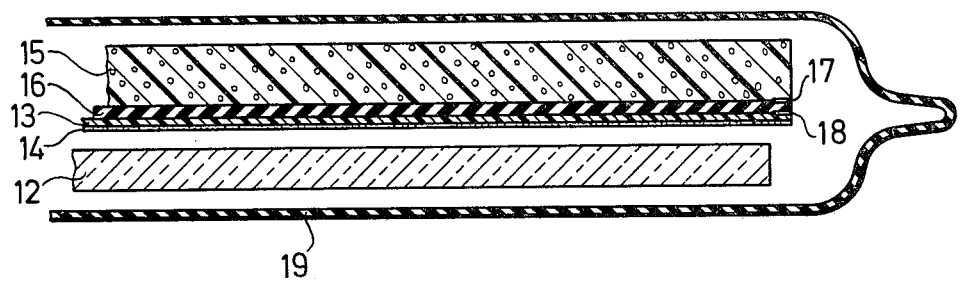
FIG. 2 is a view similar to that of FIG. 1, in which however certain of the laminations, and also the walls of the rubber bag, are shown spaced from each other for clarity, the glazing of FIG. 2 including an adhesive layer not present in the glazing of FIG. 1.

In FIG. 2 there is shown schematically in partial section a second mode of carrying out the process of the invention. In FIG. 2 a glass sheet 12 is to be laminated to a sheet of plastic 13 to form a glazing. This plastic sheet 13 is provided, on the surface thereof to be applied to the glass, with a coating 14 of an adhesive which can be made active by heat. The glass and plastic sheets 12 and 13 are to be combined under heat and pressure in an evacuable bag 19 in the manner generally described with reference to FIG. 1, and in particular with the aid of a removable laminated protective layer for the vulnerable plastic sheet 3, this protective laminate comprising a peelable silicone rubber sheet 16 and a cushion sheet 15 of foamed polyethylene, in which the pores or cells are closed. The cushion sheet 15 may have a thickness of the order of 10 mm. and the rubber sheet 16, which is smooth, may have a thickness of 2 mm. and a Shore hardness of the order of 40. These two sheets 15 and 16 joined together along at least a portion of their periphery by means of an adhesive ribbon 17. Similarly, the rubber sheet 16 of the two-part protective layer may be fastened, detachably at a part of along the whole of its periphery to the plastic sheet 13 of the glazing by means of an adhesive ribbon 18.

Before introduction thereof into the bag 19, the sheets or layers 12, 13, 16 and 15 are first assembled into a stack, the glass sheet 12 being for example laid onto the adhesive coating 14 of the temporary three-layer laminate 15, 16, 13 produced by the adhesive ribbons 17 and 18. The stack is then placed in the bag 19 of rubber of plastic material from which the air can be evacuated. The stack is thereafter subjected to a vacuum and is enclosed in its bag and is treated as hereinabove described in connection with FIG. 1.

During the evacuation step, the cushion 15 tends to stretch by reason of the fact that the pressure in the pores or cells becomes larger than that outside the cushion. Since the sheet 16 of silicone rubber and the sheet 13 of plastic are fixed at their peripheries with respect to the cushion 15 by the adhesive strips 17 and 18, the sheets 16 and 13 are stretched by the stretching of the cushion 15, and this prevents the formation of undesired creases or folds in the plastic layer 13 which forms part of the end product.

Figure 3:
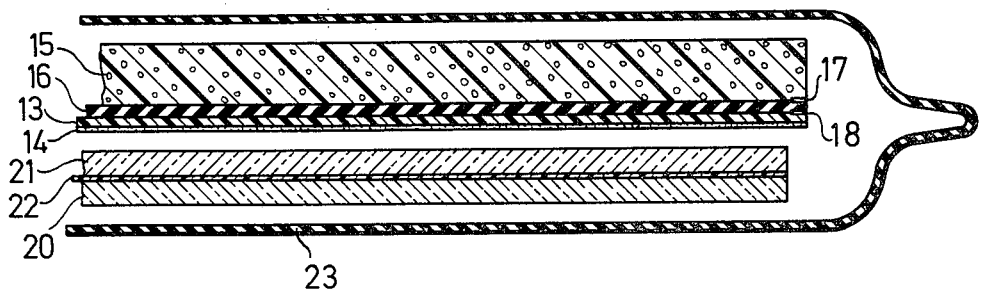
FIG. 3 is a view similar to that of FIG. 2, illustrating however the manufacture of a glazing which includes in addition to the exterior plastic layer two sheets of glass and a plastic layer between them.

FIG. 3 illustrates the process of the invention as applied to the manufacture of laminated safety glass including two sheets 20 and 21 of glass united by an intermediate thermoplastic sheet 22, and further including a plastic layer 13 on an external surface of the safety glass, in practice that which is to be turned to the interior of the vehicle.

In the manufacture of the four-layer safety glass, the layers 20, 21 and 22 are first placed in juxtaposition but without adhesive or other fastening means between them. Thereafter on this first partial stack there is disposed layer 13 coated with adhesive 14 and layers 15 and 16 with the adhesive ribbons 17 and 18. Elements 13 through 18 may be the same as or similar to the correspondingly numbered elements of FIG. 2. The complete stack is then disposed in a rubber bag 23 which is vacuum tight and in which a vacuum is produced and which is thereafter subjected to the action of heat and pressure in an autoclave. The other steps in the processing are the same as those described in the prior examples. In all of these examples, desirably, the ambient pressure about the elements of the stack is first reduced to a value below atmospheric in order to degas the elements of the stack which will form part of the glazing. The bag is sealed about the stack, either before or after this de-gassing step. After the bag has been sealed about the de-gassed elements of the glazing and about the other elements of the stack, the pressure outside the sealed bag is then raised to a pressure above atmospheric to bond the elements of the glazing together in conjuction with the application of heat thereto.

While the invention has been described hereinabove in terms of a number of presently preferred modes of practice thereof, the invention itself is not limited thereto but rather comprehends all modifications of and departures from those examples properly falling within the scope of the appended claims.

We claim:

1. A method of manufacturing a laminated glazing including a sheet of glass and a sheet of plastic adhered thereto which method comprises assembling into a stack in successive superposed relation the sheet of glass, the sheet of plastic, an elastic protective sheet and a cushion sheet of deformable material inserting the stack into a bag, reducing the pressure within the bag to a value below atmospheric, sealing the bag about the stack, thereafter raising the pressure outside the bag to a level above atmospheric and raising the temperature within the bag to a level above ambient, removing the stack from the bag, and separating the protective sheet and cushion sheet from the remainder of the stack.

2. A method according to claim 1 in which the protective sheet is made of a material having a Shore hardness of at least 30.

3. A method according to claim 1 in which the protective sheet has a thickness between 1 mm. and 3 mm. and the cushion sheet has a thickness of between 5 mm. and 30 mm.

4. A method according to claim 1 in which the protective sheet comprises silicone rubber.

5. A method according to claim 1 in which the cushion sheet comprises a cellular material.

6. A method according to claim 1 including the further step of fastening the protective and cushion sheets to each other along at least a part of their periphery prior to assembling them into the stack.

7. A method according to claim 1 in which the cushion sheet is affixed to an inside wall of the bag.

8. A method according to claim 4 in which said rubber has a Shore hardness of about 40.

9. A method according to claim 5 in which said cellular material is expanded polystyrene.

10. A method according to claim 5 in which said cellular material is polyethylene.

11. A method according to claim 5 in which said material possesses closed cells.

12. A method according to claim 6 including the further step of removably fastening the protective and plastic sheets together along at least a portion of their periphery prior to assembly thereof into the stack.

* * * * *